United States Patent
Evans et al.

(10) Patent No.: US 8,664,587 B2
(45) Date of Patent: Mar. 4, 2014

(54) NON-ROTATING LOGGING-WHILE-DRILLING NEUTRON IMAGING TOOL

(75) Inventors: Michael Evans, Missouri City, TX (US); Peter Wraight, Skillman, NJ (US); Christian Stoller, Princeton Junction, NJ (US); Avto Tkabladze, Sugar Land, TX (US)

(73) Assignee: Schlumberger Technology Corporation, Houston, TX (US)

( * ) Notice: Subject to any disclaimer, the term of this patent is extended or adjusted under 35 U.S.C. 154(b) by 318 days.

(21) Appl. No.: 12/950,375

(22) Filed: Nov. 19, 2010

(65) Prior Publication Data

US 2012/0126105 A1 May 24, 2012

(51) Int. Cl.
*G01V 5/10* (2006.01)

(52) U.S. Cl.
USPC .................................................. 250/269.4

(58) Field of Classification Search
USPC ....................................................... 250/269.4
See application file for complete search history.

(56) References Cited

U.S. PATENT DOCUMENTS

| | | | |
|---|---|---|---|
| 4,879,463 A * | 11/1989 | Wraight et al. | 250/269.2 |
| 5,250,806 A * | 10/1993 | Rhein-Knudsen et al. | 250/254 |
| 5,608,215 A | 3/1997 | Evans | |
| 5,804,820 A | 9/1998 | Evans et al. | |
| 6,300,624 B1 * | 10/2001 | Yoo et al. | 250/254 |
| 2003/0076914 A1 * | 4/2003 | Tiller et al. | 376/160 |
| 2007/0034793 A1 * | 2/2007 | Estes et al. | 250/269.1 |
| 2009/0283691 A1 * | 11/2009 | Stoller | 250/390.1 |

* cited by examiner

*Primary Examiner* — David Porta
*Assistant Examiner* — Hugh H Maupin
(74) *Attorney, Agent, or Firm* — Jeremy Berman (57) ABSTRACT

A method and apparatus for obtaining neutron images of a rock formation are provided. The neutron images can be obtained from a tool in a logging-while-drilling system but which need not rotate to obtain neutron data from a plurality of azimuthal orientations.

18 Claims, 10 Drawing Sheets

NON-ROTATING LOGGING-WHILE-DRILLING NEUTRON IMAGING TOOL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of imaging rock formations. More specifically, the invention relates to systems and methods for obtaining neutron images of a rock formation with a tool that need not rotate while drilling and/or measuring.

2. Background Art

Neutron tools have been used for several decades to measure the neutron porosity and hydrogen index of earth formations. Modern tools use pulsed neutron sources and thermal and/or epithermal neutron detectors for the measurement of the neutron flux of the neutrons at several distances from the neutron source. Additionally, the neutron slowing down time measured by one or more of the detectors is a shallow measurement of hydrogen index and very sensitive to standoff. The traditional porosity measurement relies on deriving liquid filled porosity from the ratio of the neutron fluxes from at least two different distances from the source.

Figure 1:
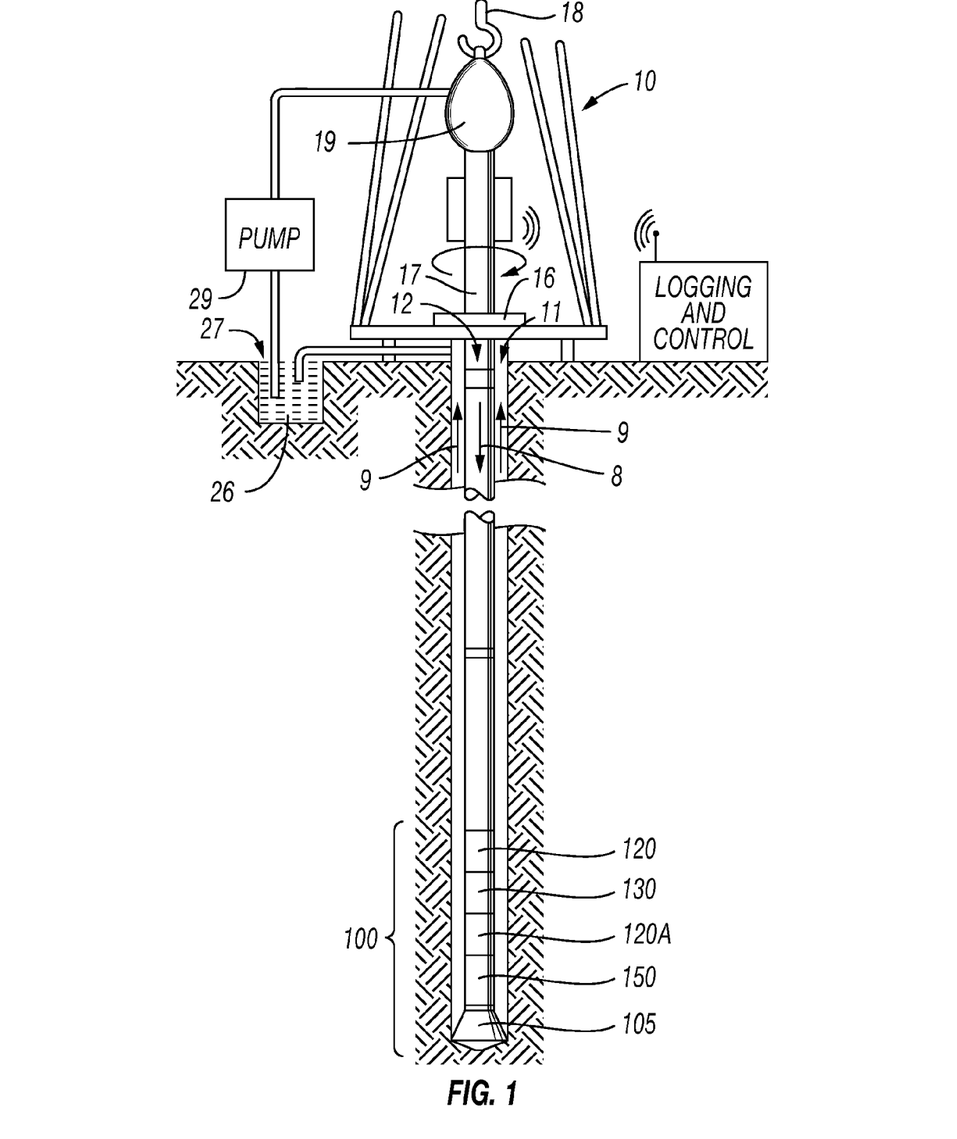
FIG. 1 is an illustration of an exemplary wellsite system.

These neutron tools are used widely in the petrochemical industry, particularly during the so-called LWD (Logging While Drilling) or MWD (Measurement While Drilling) stage, but also at other stages such Wireline. LWD/MWD is logging during the initial stage of drilling a hole down into the earth's crust typically towards an identified hydrocarbon reservoir, which should eventually form a producing oil or gas well for fulfilling energy needs. FIG. 1 is an illustration of an exemplary wellsite system, according to an exemplary embodiment. The wellsite can be onshore or offshore. In this exemplary system, a borehole 11 is formed in subsurface formations by rotary drilling in a manner that is well known.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly (BHA) 100 of the illustrated embodiment comprises a logging-while-drilling (LWD) module 120, a measuring-while-drilling (MWD) module 130, a rotary-steerable system and motor, and drill bit 105. The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. As an example that relates to the present disclosure, the LWD module can include a nuclear measuring device or neutron tool to measure, for example, the porosity of the surrounding formation.

The MWD module 130 is also housed in a special type of drill collar, as is known in the art, and can contain one or more devices for measuring characteristics of the drill string and drill bit. The MWD tool further may include an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 2:
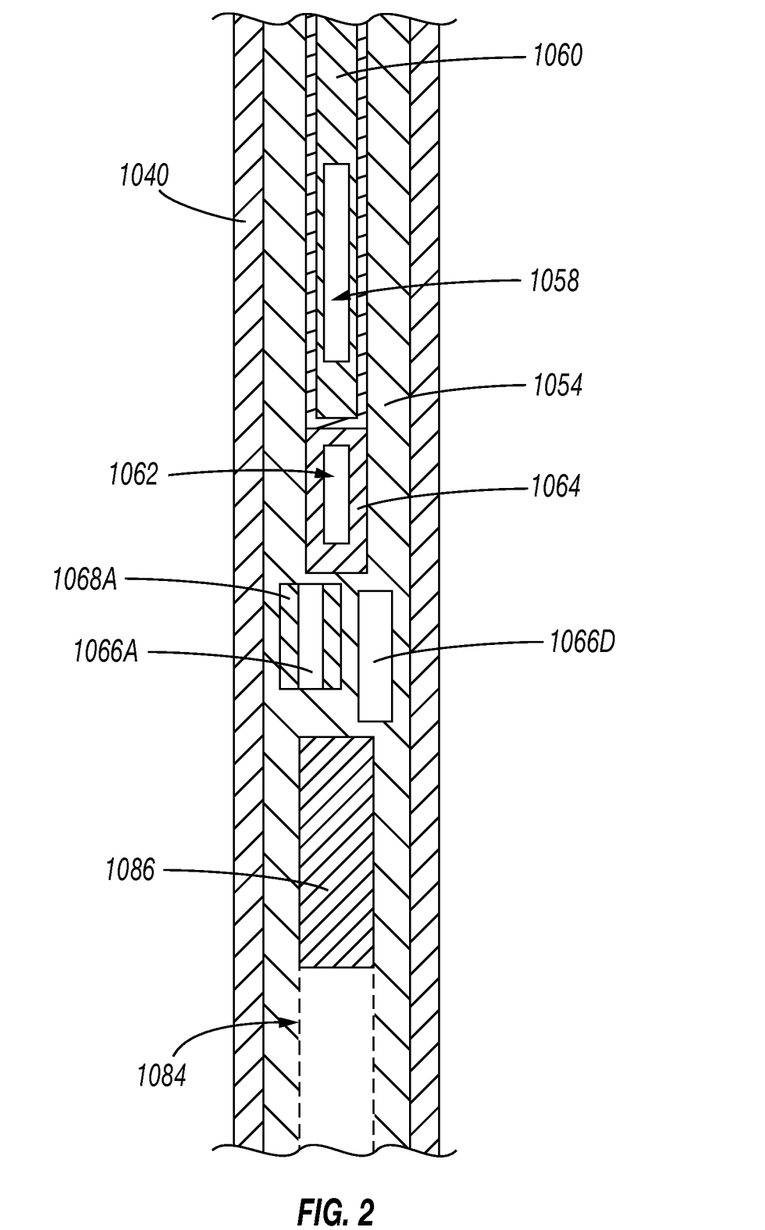
FIG. 2 shows a logging-while-drilling nuclear device utilizing an accelerator-based source.

FIG. 2 shows a logging-while-drilling nuclear device as disclosed in U.S. Pat. Re. 36,012, incorporated herein by reference, which utilizes an accelerator-based source, it being understood that other types of nuclear LWD tools can also be utilized as the LWD tool 120 or part of an LWD tool suite 120A. In FIG. 2, a drill collar section 1040 is shown as surrounding a stainless steel tool chassis 1054. Formed in the chassis 1054 to one side of the longitudinal axis thereof (not visible in this view) is a longitudinally extending mud channel for conveying the drilling fluid downward through the drill string. Eccentered to the other side of the chassis 1054 are a neutron accelerator 1058, its associated control and high voltage electronics package 1060 and a coaxially aligned near-spaced detector 1062. The near-spaced detector 1062 is primarily responsive to accelerator output with minimum formation influence. The detector 1062 is surrounded, preferably on all surfaces except that adjacent to the accelerator 1058, by a shield 1064 of combined neutron moderating-neutron absorbing material. The output of the near detector 1062 is used to normalize other detector outputs for source strength fluctuation. Located longitudinally adjacent to the near-spaced detector 1062 is a plurality or array of detectors, of which 1066a and 1066d are shown in this view. The detector 1066a is back-shielded, as shown at 1068a. The array includes at least one, and preferably more than one, epithermal neutron detector and at least one gamma ray detector, represented in this example at 1084, with shield 1086. One or more thermal neutron detectors can also be included. The above-referenced U.S. Pat. Re. 36,012 can be referred to for further details. The detector signals can be utilized to determine, inter alia, formation density, porosity, and lithology.

As may be understood to those of ordinary skill in the art having benefit of the present disclosure, in conventional LWD wellsite systems such as those described above with reference to FIGS. 1 and 2, the entire drill string 12 often rotates while the drilling operation is performed, whether by a kelly 17 system or a top drive system. Moreover, in conventional LWD wellsite systems that include a nuclear tool, such as the LWD tool 120 described above, the tool 120 being part of the BHA 100 also rotates during the drilling operations. Accordingly, in LWD nuclear, conventional imaging measurements are made possible due to the fact that the tool rotates in the borehole and an azimuthally focused measurement will therefore make an azimuthal scan of the surrounding formation as the tool rotates. In the absence of tool rotation, i.e. when the tool is sliding, no image can be acquired for these tools. Moreover, additional LWD systems have been developed in recent years in which the entire drill string may not rotate or rotate only very slowly, such as where there is a downhole motor and/or where coiled tubing drilling is used, signifying yet another deficiency with rotation-based neutron imaging in LWD applications.

Accordingly, there is a need in the art for methods and systems for neutron imaging that overcome one or more of the deficiencies that exist with conventional methods.

SUMMARY OF THE INVENTION

In one aspect, a well logging instrument is provided. The well logging instrument can include a neutron source and a first plurality of neutron detectors. The first plurality of neutron detectors can be azimuthally separated from each other.

In another aspect, a method for logging a wellbore is provided. The method can include placing a well logging tool in the wellbore, and measuring at least a neutron porosity of the wellbore in a plurality of azimuthal directions while the tool remains at a substantially constant azimuthal orientation.

Other aspects and advantages of the invention will be apparent from the following description and the appended claims.

DETAILED DESCRIPTION

The invention provides for obtaining neutron data and images of a rock formation with a tool that need not rotate while drilling and/or measuring. Methods and systems for obtaining such neutron-based images will now be described with reference to FIGS. 3-9, which depict representative or illustrative embodiments of the invention.

As discussed above, various wellsite systems exist in which a neutron imaging tool may not necessarily rotate while making measurements. Various non-exhaustive examples of situations arising in such wellsite systems include wireline systems and logging-while-drilling systems in which the entire drill string may not rotate. Such LWD systems may include systems with mud motors or other downhole motors for powering the drillbit, and coiled tubing drilling systems. Such LWD systems also can include conventional LWD systems during a sliding operation rather than a drilling operation. Though a significant portion of the following disclosure may reference coiled tubing drilling systems, the discussion is intended as an example only. As may be recognized by one of ordinary skill in the art having benefit of the present disclosure, the exemplary embodiments discussed herein can be applied to various other wellsite systems where neutron imaging tools that need not rotate may be desirable.

Figure 3:
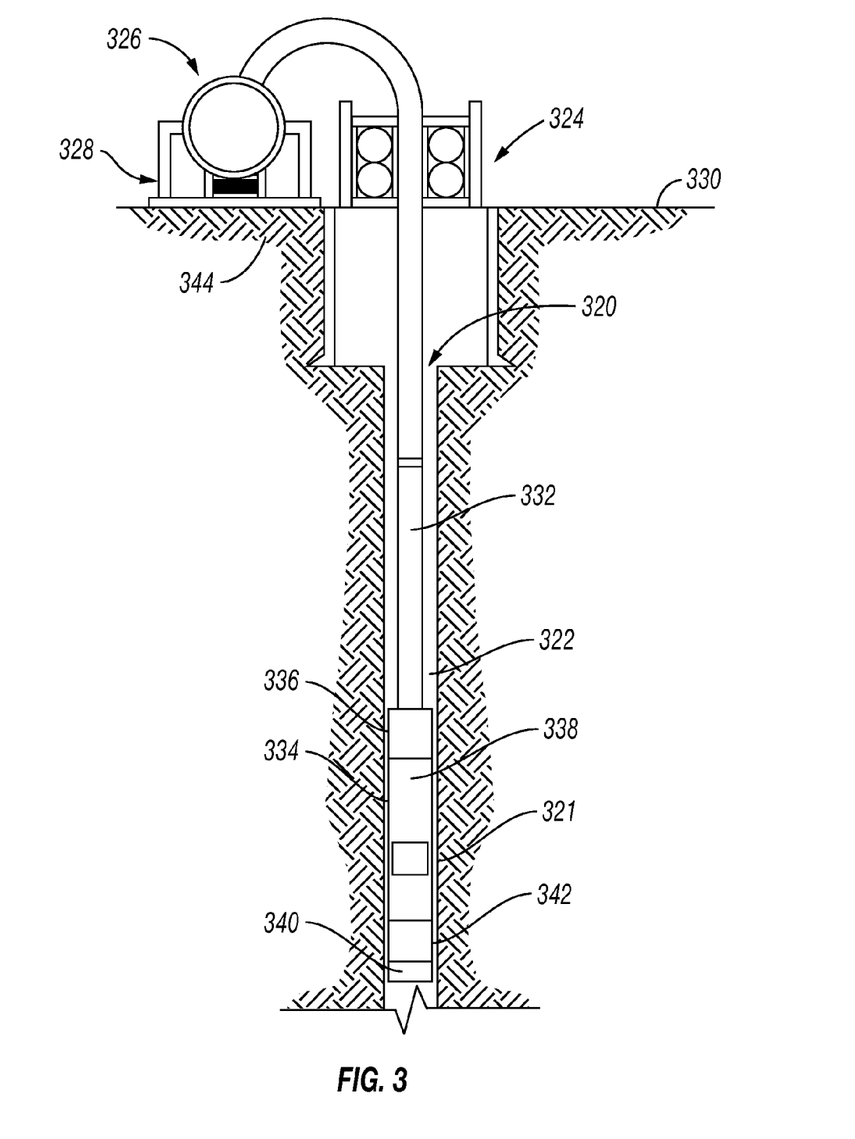
FIG. 3 illustrates a well drilling system according to an exemplary embodiment.

Referring generally to FIG. 3, which illustrates a well drilling system according to an exemplary embodiment, one embodiment of a well drilling system 320 is illustrated as being operated to drill a borehole 322 for use in a well 324. The illustrated well drilling system 320 is a coiled tubing drilling system that forms part of an overall coiled tubing drilling installation 326. The coiled tubing drilling installation 326 may have a variety of components and systems, but the example illustrated generally comprises a coiled tubing rig and injector installation 328 positioned at a surface 330 proximate the top of well 324.

The drilling system 320 generally comprises coiled tubing 332 connected to a coiled tubing bottom hole assembly 334 through an orienter 336. As illustrated, orienter 336 is connected to bottom hole assembly 334 at an uphole or top end 338 of the bottom hole assembly. Alternatively, the bottom hole assembly 334 can be positioned above the orienter 336, which may result in the bottom hole assembly 334 not rotating as frequently or at all. Furthermore, the bottom hole assembly 334 may comprise a variety of components but generally includes a drill bit 340 driven to form the borehole 322. Drill bit 340 may be rotated by a motor 342, e.g. a mud motor, or by another suitable driving device. In this embodiment, motor/device 342 is a steerable device, such as a steerable mud motor, that may be directionally controlled to drill borehole 322 along a variety of desired trajectories through a reservoir 344. Coiled tubing bottom hole assembly 334 also may comprise a variety of other components depending on the specific application environment. As discussed in greater detail below, the bottom hole assembly may have a variety of sensors and signal transmission systems to provide an operator with real-time data and/or other data helpful in both drilling borehole 322 and in steering the bottom hole assembly.

By way of example, the bottom hole assembly 334 may comprise measurement while drilling systems and/or logging while drilling systems as discussed previously. For example, an LWD tool 321 such as a neutron imaging LWD tool can be placed within the bottom hole assembly 334, in which case to tool 321 may not rotate during the drilling operation, since it is above the mud motor 342 that rotates the drill bit 340.

Figure 4A:
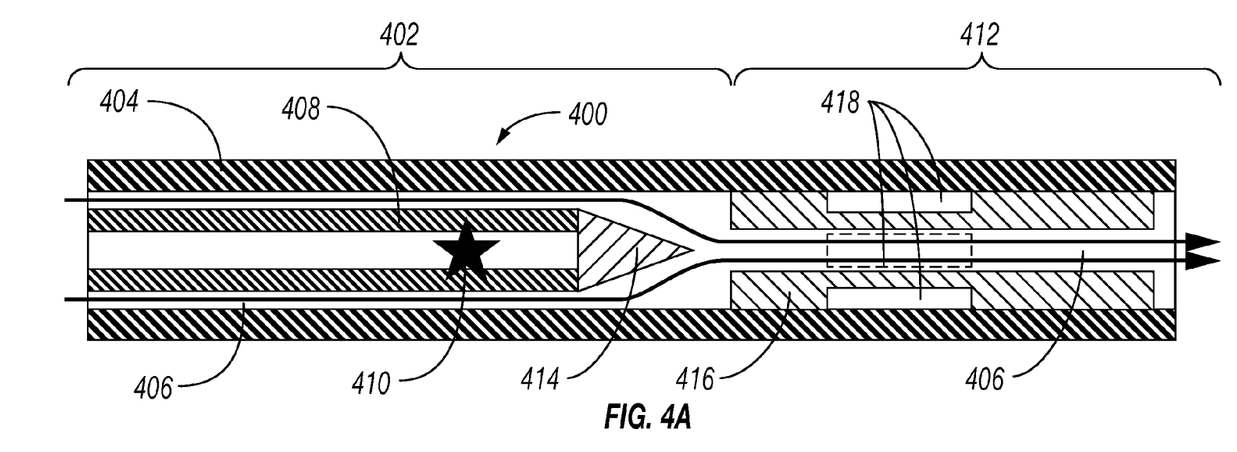
FIGS. 4A-C are different views of a schematic of a neutron imaging tool, according to an exemplary embodiment.
Figure 4B:
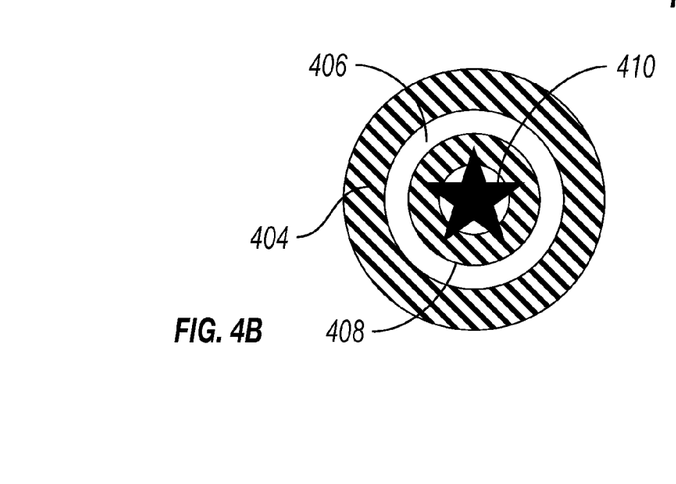
Figure 4C:
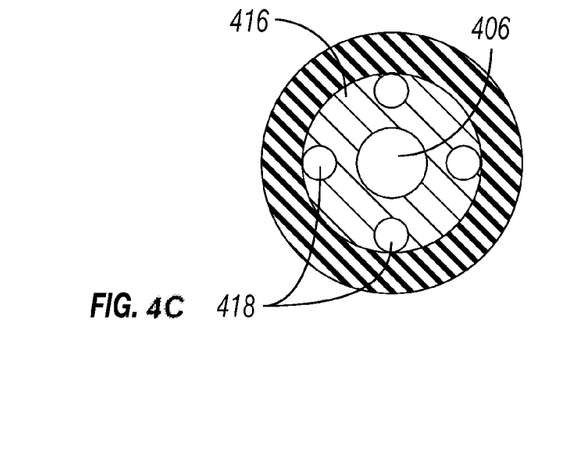

FIGS. 4A-C are different views of a schematic of a neutron imaging tool 400, according to an exemplary embodiment. FIG. 4A illustrates the neutron imaging tool 400 in a longitudinal cross section, while FIGS. 4B and 4C illustrate the neutron imaging tool 400 at latitudinal cross sections at different axial positions. In various exemplary embodiments, as may be recognized by one of ordinary skill in the art, the term neutron imaging tool 400 can include a variety of different tools that, for example, can be capable of obtaining measurements of a formation to determine neutron porosity, hydrogen index, lithology and other properties of the formation using a neutron source and detecting neutrons and/or gamma-rays. This may include gamma-rays spectroscopy measurements as well as time-base measurements such as the determination of the macroscopic thermal neutron capture cross section of the formation and borehole (Sigma) or the epithermal neutron slowing down time and the measurement of neutron gamma density (U.S. Pat. No. 5,608,215, U.S. Pat. No. 5,804,820). Additionally, the tool standoff can be determined and the combination of the stand off measurements at different azimuths can be used to determine the diameter and in the case of detectors at more than two azimuths the borehole shape. In exemplary embodiments, the neutron imaging tool 400 also can be used to analyze the neutron-based measurements collected to extrapolate or identify an image or survey of the formation. While $^3$He detectors may be preferred in certain embodiments and/or situations, any other suitable detector of thermal or epithermal neutrons such as Li-glass, $^{10}$B-lined proportional counter, and the like may be used.

The exemplary neutron imaging tool 400 includes a variety of structural components. A first section 402 of the neutron imaging tool 400 can include a collar 404, a mud channel 406, a pressure housing 408, and a neutron source 410 within the pressure housing 408 of the neutron source section of the imaging tool 400. The collar 404 can provide an enclosure for the neutron imaging tool 400 and the mud channel and can be made from a variety of materials, such as high strength steel (typically non-magnetic), high strength Ni-alloys or Titanium to name a few. In the case of neutron tools it may be advantageous to use materials with small absorption cross sections for epithermal or thermal neutrons to maximize the number of neutrons at the detector(s). The mud channel 406 provides a channel through which the drilling mud can flow through the neutron imaging tool 400. The pressure housing 408 can function to maintain a low pressure environment for the neutron source, sensors and electronics contained therein, and can be made from materials such as high strength steel, Ni-alloys, titanium or other materials suitable for withstanding the harsh downhole environment and withstanding the downhole pressure.

A second section 412 of the neutron imaging tool 400 can include continuations of some of the components of the first section 402, such as the collar 404 and the mud channel 406. As shown in FIG. 4A, the collar 404 can extend straight through the first and second sections 402, 412 of the neutron imaging tool 400, while the mud channel 406 may angle or extend toward the center of the neutron imaging tool 400 from the first section 402 to the second section 412. This extending or angled section can be effectuated by a flow diverter 414. The second section 412 of the neutron imaging tool 400 can further include a chassis 416, and a set of neutron detectors 418. The chassis 416 can provide a structure to hold and/or stabilize the neutron detectors 418 thereon and to protect the components mounted in the chassis from the high pressure fluid in the mud channel, and can be made from materials such as high strength steel, Ni-alloys, titanium or other materials suitable for withstanding the harsh downhole environment and withstanding the downhole pressure.

In the illustrated embodiment, the four neutron detectors 418 are spaced at approximately 90 degree azimuthal intervals, though other suitable arrangements are possible. In various exemplary embodiments, one or more of the neutron sources 410 can include a radioisotope source or an electronic neutron generator such as a d-T generator. In certain embodiments, particularly if an electronic neutron generator is used, then a neutron monitor (not shown) may be installed near the neutron generator to measure the (variable) flux of neutrons and to allow normalization of the neutron detector 418 counts with respect to the number of neutrons emitted from the source 410.

Moreover, in alternative embodiments, the number of neutron detectors 418 mounted on the circumference can be as few as two detectors 418. In certain embodiments, having two detectors 418 may be most feasible if it is possible to orient the neutron imaging tool 400 in such a way that the detectors 418 point to a preferred azimuth. For example, in many situations, the preferred azimuthal directions to capture may be the upward and downward directions. However, in various other situations (e.g., in case of significantly irregularly-shaped wellbore), different azimuthal orientations might be preferable, as may be recognized by one of ordinary skill in the art having benefit of the present disclosure. In certain embodiments, particularly where the orientation of the neutron imaging tool 400 cannot be easily controlled, it may be beneficial to have at least four or six neutron detectors 418 azimuthally spaced from each other. In tools 400 with a large diameter, additional neutron detectors 418 could be accommodated. Such neutron detectors could include azimuthally sensitive neutron detectors.

The neutron detectors 418 can either be epithermal neutron detectors or thermal neutron detectors. Traditionally, many neutron tools used thermal neutron detectors to obtain the highest possible count rates and therefore the best precision. Also, thermal detectors allow the measurement of Sigma. On the other hand epithermal detectors, while counting fewer neutrons, are less sensitive to the presence of neutron absorbers in the borehole or the formation. Neutron shielding 520 may be used between the source 410 and the detectors 418 to reduce the probabilities of neutron traveling directly from the source 410 to the detectors 418.

One benefit of having multiple sensors located at different azimuthal orientations is the ability to make measurements to enable neutron imaging without having to rotate a tool 400 or other body on which the neutron detectors 418 are placed. In other words, the neutron density tool 400 (and the neutron detectors 418) can remain substantially at the same azimuthal orientation while obtaining the necessary neutron measurements from a plurality of azimuthal directions. In certain embodiments, a substantially constant orientation need not require the tool 400 to remain at exactly the same orientation over the relevant time period, but rather indicates a state during which the tool 400 does not make significant rotations and/or is not intended to rotate but may do so inadvertently as the tool 400 moves axially within a borehole or similar environment. In this way, the neutron imaging tool 400 can be used with conventional LWD systems involving a rotating drillstring or rotating bottom hole assembly to provide neutron measurements such as neutron porosity and hydrogen index of a formation of interest while the formation is being drilled, whether in rotating or non-rotating mode (e.g., while sliding). Moreover, the neutron imaging tool 400 can be used with other LWD systems—such as coiled tubing drilling systems or other LWD systems with downhole motors in which the entire drillstring and/or BHA does not rotate. If the tool is rotating slowly, as may be the case in a coiled tubing drilling system, the tool may be able to combine the advantages of both the non-rotating and the rotating measurement. It must be understood that either of these measurements can rely on a measurement of the tool azimuthal orientation at the time of the measurement.

Figure 5A:
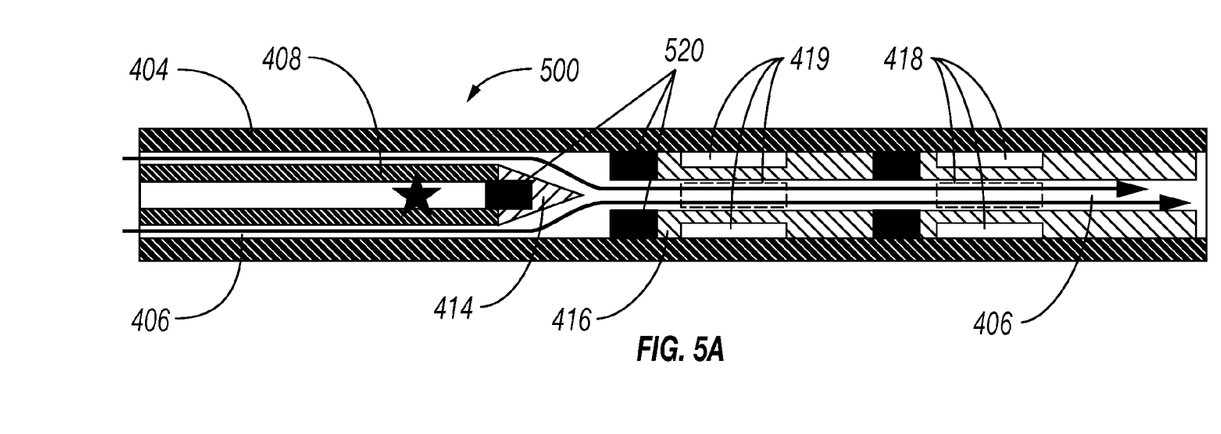
FIGS. 5A-C are different views of a schematic of a neutron imaging tool, according to an alternative exemplary embodiment.
Figure 5B:
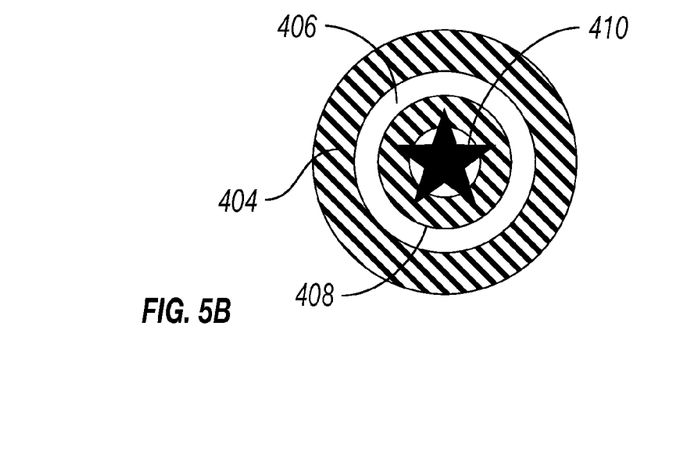
Figure 5C:
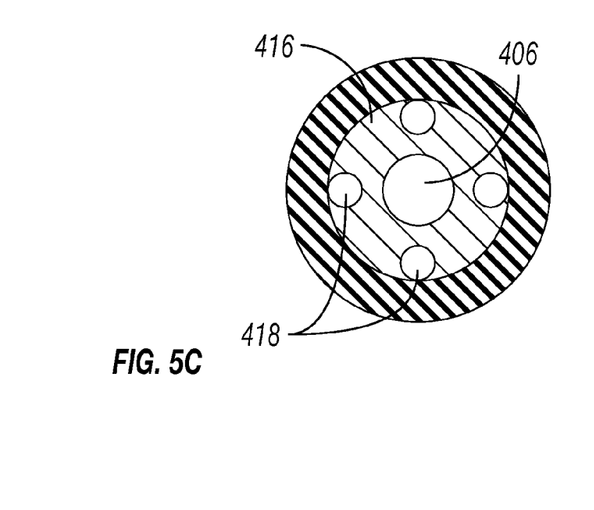

FIGS. 5A-C are different views of a schematic of a neutron imaging tool 500, according to an alternative exemplary embodiment. FIG. 5A illustrates the neutron imaging tool 500 in a longitudinal cross section, while FIGS. 5B and 5C illustrate the neutron imaging tool 500 at latitudinal cross sections at different axial positions.

The primary difference between the neutron imaging tool 400 of FIG. 4 and the neutron imaging tool 500 of FIG. 5 is that the latter includes two sets of detectors 418, 419. In an exemplary embodiment, the neutron imaging tool 500 also can include a neutron monitor (not shown) to measure the (variable) flux of neutrons and to allow normalization of the neutron detector 418, 419 counts with respect to the number of neutrons emitted from the source 410 The neutron monitor could, for example, be a plastic scintillation detector as described in U.S. Pat. No. 6,884,994, a semiconductor detector (SiC, diamond), a gas counter filled with a gas such as hydrogen or helium ($^4$He), or other suitable configurations that may be recognized by one of ordinary skill in the art having benefit of the present disclosure. In exemplary embodiments, using two or more sets of detectors 418, 419 can enable the correction for some of the effects caused by detector standoff, borehole size and unknown or poorly known borehole fluid composition. This may be possible because when standoff exists, effectively different amounts of mud are generally present between the near detector and the borehole wall versus the far detector and the borehole wall. These differences can be used to approximate and correct for the standoff.

Moreover, in certain embodiments, the number of neutron detectors 418, 419 need not be the same at the different axial positions along the neutron imaging tool 500. Azimuthal resolution at the shorter distance may be better, and thus a larger number of detectors 419 (e.g., eight detectors) could be distributed over the circumference of the tool 500 at the near location and fewer (e.g., four) detectors 418 at the far location. In exemplary embodiments, it may be advantageous to have the near and far detectors 418, 419 at the same or approximately the same azimuth. In alterative embodiments, it is possible to locate the detectors 418, 419 at different azimuths in the two axially separated locations.

Figure 6A:
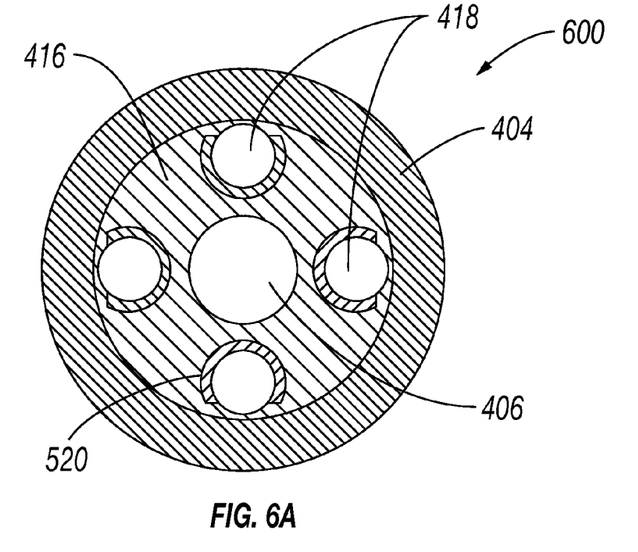
FIGS. 6A-6B illustrate alternative latitudinal cross-sections of a neutron imaging tool, according to exemplary embodiments.
Figure 6B:
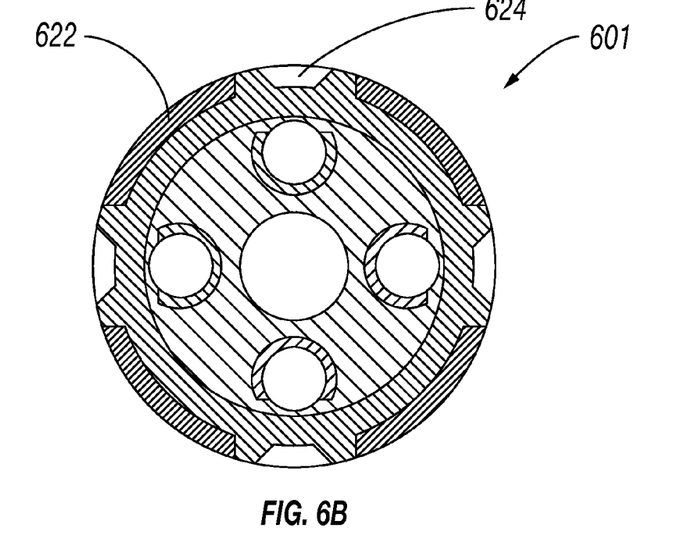

FIGS. 6A-6B illustrate alternative latitudinal cross-sections of a neutron imaging tool 600, 601, according to exemplary embodiments. Both FIGS. 6A and 6B illustrate options for shielding the neutron detectors 418 in order to enhance their azimuthal sensitivity. In one embodiment, as shown in FIG. 6A, each detector 418 can be provided with a neutron shield 520 that reduces the probability of neutrons entering from the side or the back. Such shielding 520 can use any suitable neutron absorber. Typical materials could be natural boron or, for enhanced performance, boron enriched with the $^{10}$B isotope. Boron could be in its elemental form or in the form of a chemical compound like $B_4C$. Typically, the absorber would be in the form of a coating possibly in a matrix of a different material. Alternatively, the material can be embedded in an elastomer or be mixed with an Epoxy to give a small number of examples. In place of boron or enriched $^{10}$B, one could use other neutron absorbers like $^6$Li, Cd or Gd to name a few.

FIG. 6B illustrates different options for shielding the neutron detectors 418, which can be used either in addition to or instead of the neutron shields 520 of FIG. 6A. The illustrated embodiment includes the neutron shields 520 of FIG. 6A, and additionally, a collar 404 or external shielding 622 can be applied to the collar 404 in order to reduce the number of neutrons entering the detector 418 from undesired directions. Additionally, in exemplary embodiments, the collar 404 can be made thinner over the detector 418 to reduce neutron scattering and absorption, thereby creating neutron windows 624. In certain exemplary embodiments, these neutron windows 624 can be backfilled with a material with a small cross section of neutron absorption or scattering, which can reduce the effect of the borehole fluid on the measurement made by the neutron detectors 418. Such materials can include compounds like PEEK or PEKK, which have lower hydrogen content than the borehole fluid or metals with a low neutron absorption cross section. In yet a different alternative the neutron windows 624 or other thinning could be present on the inside of the collar 404.

Figure 7:
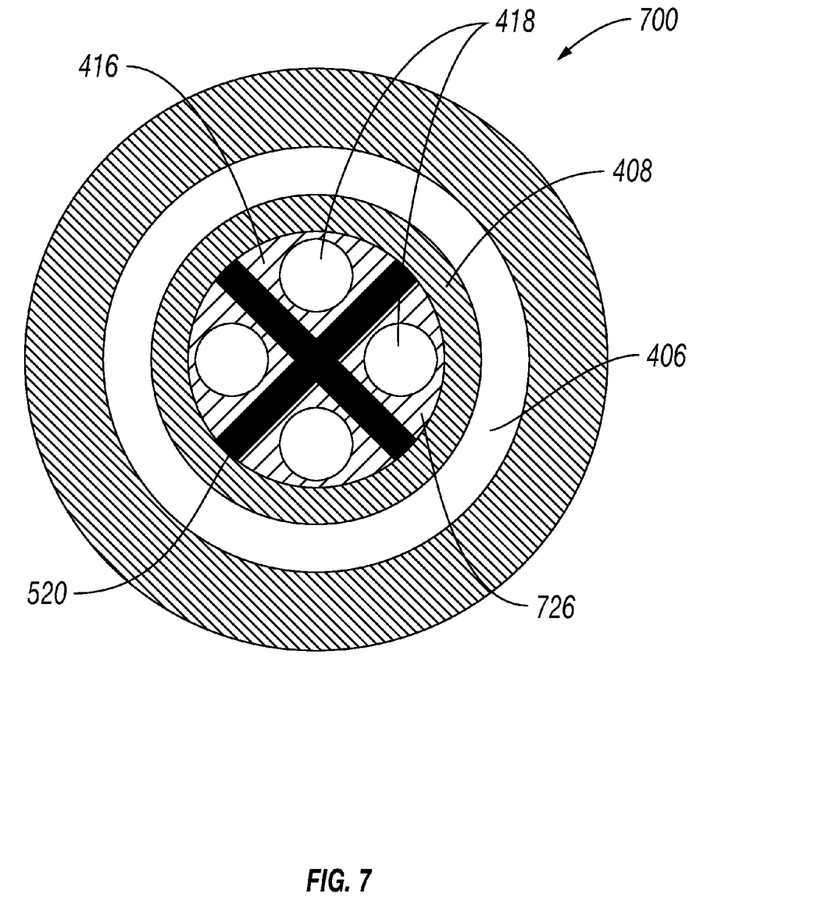
FIG. 7 illustrates a latitudinal cross-section of an alternative neutron imaging tool, according to an exemplary embodiment.

FIG. 7 illustrates a latitudinal cross-section of an alternative neutron imaging tool 700, according to an exemplary embodiment. As shown in FIG. 7, the neutron detectors 418, 419 can be mounted within the mandrel section 726 of the neutron imaging tool 700, rather than being mounted on the chassis 416 (as shown in FIGS. 4-6). Such a configuration may be necessary if it is difficult to mount the neutron detectors 418, 419 on the chassis 416 or collar 404. Additionally, mounting the neutron detectors 418, 419 in the mandrel section 726 can allow installation of one or more gamma-ray detectors (not shown) with sufficient efficiency to perform a spectroscopy measurement. Placement of gamma-ray detectors in the mandrel section 726 is preferred at least in tools with a small diameter, as it allows the use of a larger and therefore more efficient gamma-ray detector. The available diameter in the mandrel is generally larger than in the chassis 416 or the collar 404, in tools in which the mud channel 406 in the chassis 416 is typically on the tool axis or near it. A centered mud channel 406 is advantageous for a tool that has detectors at multiple azimuths, as it insures the needed symmetry of the measurement of different detectors and allows space for mounting them independently of the chosen azimuths. Mounting the neutron detectors 418, 419 in the mandrel section 726 may have certain disadvantages, however. For example, the increased distance of the detectors 418, 419 from the formation may reduce the neutron detection probability and the azimuthal sensitivity. Four detectors 418, 419 are mounted in the mandrel section 726, with the neutron shields 520 being placed within the mandrel section 726 as well for azimuthal sensitivity. In another embodiment, additional (not shown) shielding could be applied to the outside of the collar 404 and pressure housing 408 to improve focusing. In alternative embodiments, the set of neutron detectors 418 could be replaced by a multi-wire detector (not shown) to simplify the construction.

Figures 8A, 8B, 8C:
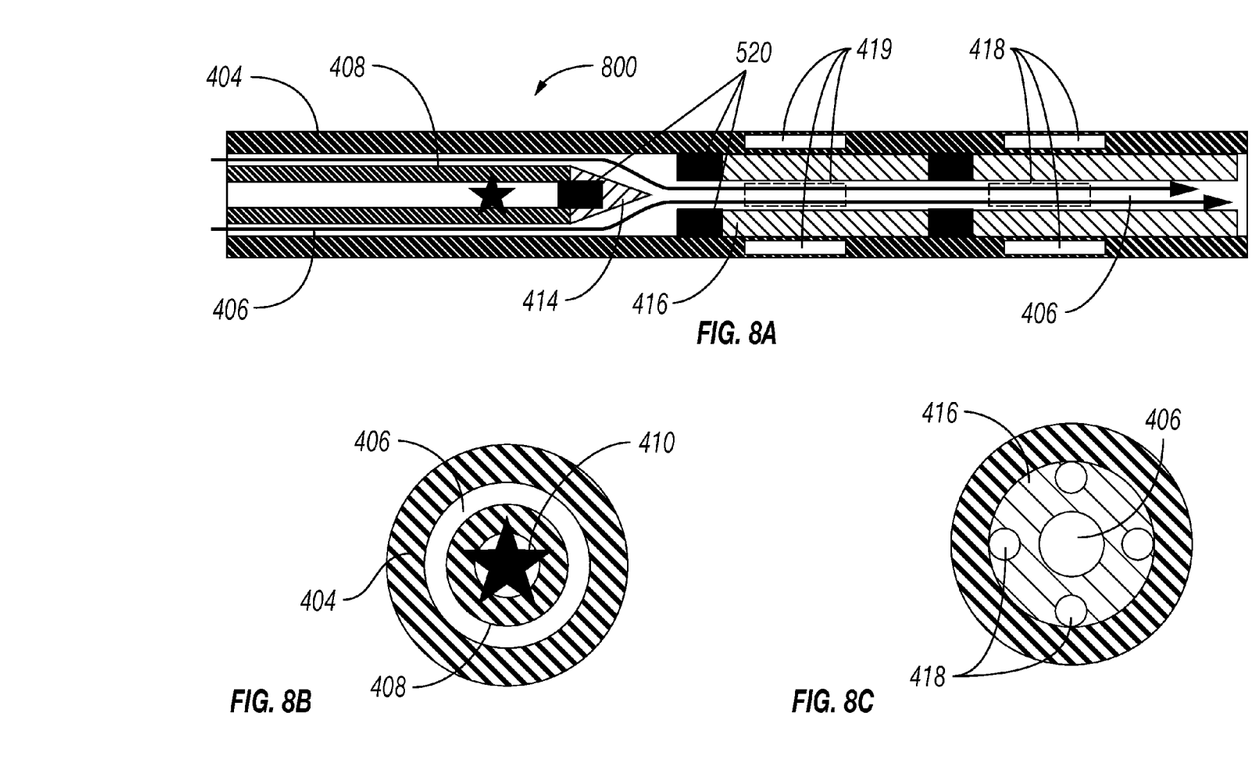
FIGS. 8A-C are different views of a schematic of a neutron imaging tool, according to an alternative exemplary embodiment.

FIGS. 8A-C are different views of a schematic of a neutron imaging tool 800, according to an alternative exemplary embodiment. FIG. 8A illustrates the neutron imaging tool 800 in a longitudinal cross section, while FIGS. 8B and 8C illustrate the neutron imaging tool 800 at latitudinal cross sections at different axial positions.

The primary difference between the neutron imaging tools 400, 500 of FIGS. 4 and 5 and the neutron imaging tool 800 of FIG. 8 is that the neutron detectors 418, 419 of this neutron imaging tool 800 are mounted in the collar 404 itself. Such a configuration can afford the highest neutron sensitivity and the best azimuthal resolution, due at least in part to the neutron detectors 418, 419 being positioned closer to the formation. In exemplary embodiments, the electronics (not shown) for the neutron detector 418 can be mounted in the collar 404 as well. In such embodiments, feedthroughs may be needed to bring the signals from the neutron detectors 418, 419 into the chassis 416.

Similarly to the embodiments discussed previously, the detectors 418, 419 can be back-shielded 520 to enhance azimuthal sensitivity. In certain embodiments, such as if there is not enough room for backshielding or if azimuthal sensitivity needs to be enhanced further, external neutron shielding 622 could be applied between the detectors 418, 419 on the collar 404. Alternatively, as shown in FIG. 9, which is a latitudinal cross-section of a neutron imaging tool 900 according to an exemplary embodiment, the chassis 416 can be surrounded with internal neutron shielding 928 comprising a neutron absorbing material, such as various isotopes of boron or other suitable materials that may be recognized by one of ordinary skill in the art having benefit of the present disclosure.

Figure 9:
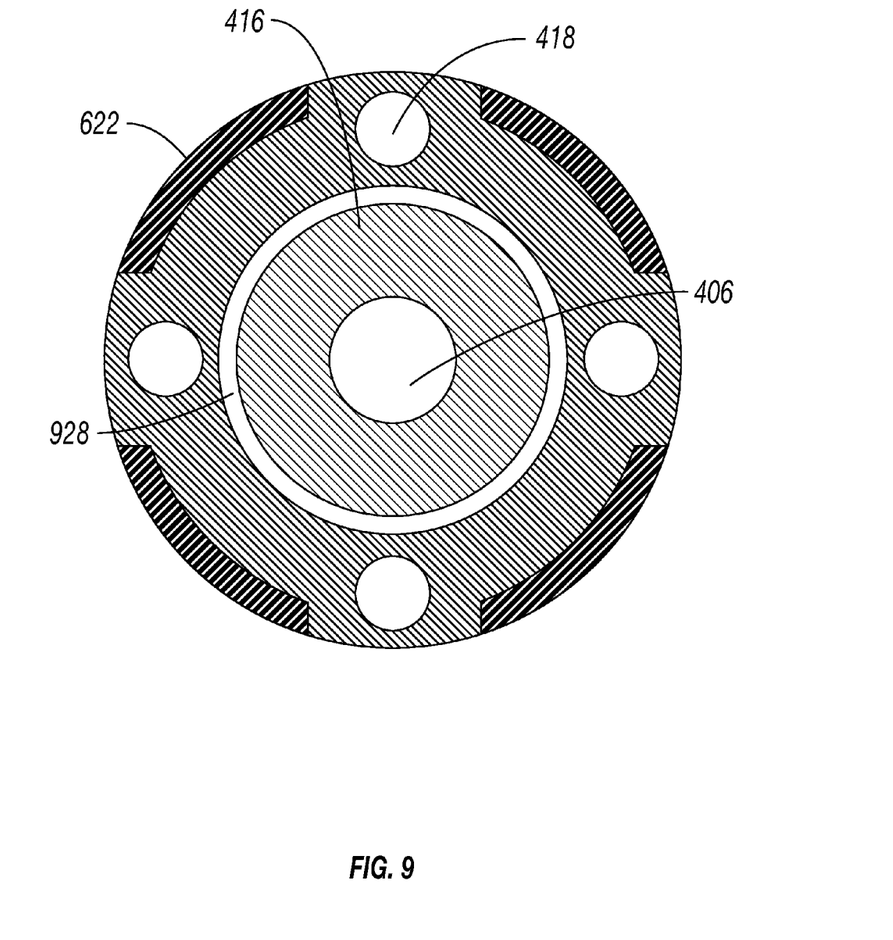
FIG. 9 is a latitudinal cross-section of a neutron imaging tool according to an exemplary embodiment.

In embodiments with detectors 418 are mounted in the collar 404—such as the embodiment illustrated in FIG. 9—the neutron detectors 418 can be installed in machined slots under a protective cover. Each detector 418 or possibly all detectors 418 of one azimuthal position can be installed in a pressure housing 408 before being mounted on the tool 900. Alternatively, where mechanically possible, the neutron detectors 418 can be installed in axial holes in the collar 404. Such a configuration could allow installation without a pressure housing 408 around the neutron detectors 418.

Figure 10:
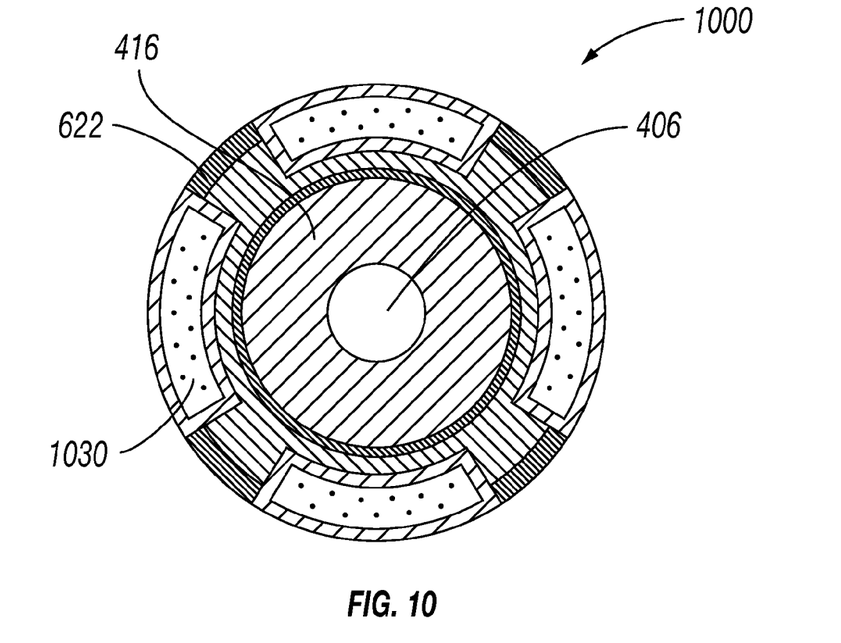
FIG. 10 is a latitudinal cross-section of a neutron imaging tool 1000 according to an alternative exemplary embodiment.

FIG. 10 is a latitudinal cross-section of a neutron imaging tool 1000 according to an alternative exemplary embodiment. The embodiment of FIG. 10 differs from that of FIG. 9 primarily by the single neutron detectors 418 of FIG. 9 being replaced by azimuthally sensitive neutron detectors that comprise multi-wire detectors 1030. These multi-wire detectors 1030 can allow azimuthal readouts. These position sensitive or azimuthally sensitive detectors could be supplemented by additional neutron shielding on the outside (not shown) to enhance the azimuthal sensitivity, in addition to the previously discussed external and internal neutron shielding 622, 928.

Figure 11:
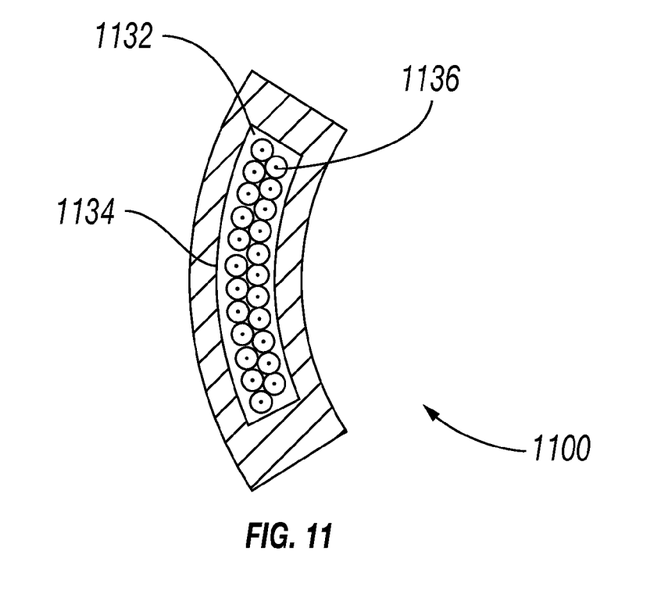
FIG. 11 illustrates a cross section of an azimuthally sensitive neutron imaging detector 1100, according to an exemplary embodiment.

FIG. 11 illustrates a cross section of an alternative embodiment of the neutron detector 1030 of FIG. 10, according to an exemplary embodiment. As shown in FIG. 11, a position sensitive detector can consist of a bundle of neutron detectors 1132 ($^3$He, $^{10}$B-lined tubes), arranged in an array 1134 with a wire 1136 disposed therein. The embodiment of FIG. 11 allows mixing epithermal and thermal neutron detectors as part of the imaging detector. In particular, if the detector is shielded against neutrons entering from the back, the inner layer(s) of the detector would be more sensitive to epithermal neutrons as the outer detectors will have absorbed a larger fraction of the thermal neutrons.

As may be recognized by one of ordinary skill in the art having benefit of the present disclosure, additional embodiments consistent with the disclosure are possible. As examples only, while the description above shows one or two axially spaced sets of neutron detectors, a larger number of spacings could be chosen to improve environmental corrections. One or more detectors facing the mud channel and shielded from neutrons entering from the borehole could be considered to improve environmental corrections. Additionally, in other embodiments, if a short neutron generator is used, neutron and/or gamma-ray detectors could be mounted on both sides of the generator. Moreover, pairs of detectors (thermal and epithermal) could be used at each or some azimuthal locations.

Although specific embodiments of the invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed is:

1. A well logging instrument comprising: a neutron source; a first plurality of neutron detectors, the first plurality of neutron detectors being azimuthally separated from each other; wherein at least one of the first plurality of neutron detectors comprises at least one of a $^{10}$B based neutron detector, an Li-glass neutron detector, and a $^{10}$B-lined neutron detector; wherein the first plurality of neutron detectors comprises a first neutron detector and a second neutron detector; and wherein the first neutron detector is azimuthally separated from the second neutron detector by approximately 180 degrees.

2. The well logging instrument of claim 1, wherein the first plurality of neutron detectors further comprises a third neutron detector and a fourth neutron detector, wherein the third neutron detector is azimuthally separated from the first neutron detector by approximately 90 degrees, and wherein the fourth neutron detector is azimuthally separated from the second neutron detector by approximately 90 degrees.

3. The well logging instrument of claim 1, further comprising a second plurality of neutron detectors axially separated from the first plurality of neutron detectors.

4. The well logging instrument of claim 1, further comprising a collar, a chassis, and a pressure housing, wherein the neutron source is disposed within the pressure housing, wherein the pressure housing is disposed within the collar, and wherein at least a portion of the first plurality of neutron detectors is mounted on the chassis.

5. The well logging instrument of claim 1, further comprising a neutron shield comprising boron.

6. The well logging instrument of claim 5, wherein the neutron shield comprises at least one of a neutron shield placed between a neutron detector and the chassis, and an external neutron shield placed on the collar.

7. The well logging instrument of claim 1, further comprising a neutron window in the collar.

8. The well logging instrument of claim 1, wherein at least one of the first plurality of neutron detectors comprises a thermal neutron detector.

9. The well logging instrument of claim 1, wherein at least one of the first plurality of neutron detectors comprises an epithermal neutron detector.

10. The well logging instrument of claim 1, wherein at least one of the first plurality of neutron detectors comprises a $^3$He neutron detector.

11. The well logging instrument of claim 1, wherein at least one of the first plurality of neutron detectors comprises an azimuthally sensitive neutron detector for thermal or epithermal neutrons.

12. A method for logging a borehole in a formation, comprising the steps of: placing a well logging tool in the borehole; and measuring a property of the formation or the borehole in a plurality of azimuthal directions using azimuthally separated neutron detectors while the tool remains at a substantially constant azimuthal orientation, at least one of the neutron detectors comprising at least one of a $^{10}$B based neutron detector, an Li-glass neutron detector, and a $^{10}$B-lined neutron detector, wherein the first plurality of neutron detectors comprises a first neutron detector and a second neutron detector, and wherein the first neutron detector is azimuthally separated from the second neutron detector by approximately 180 degrees.

13. The method of claim 12, wherein the well logging tool is sliding within the wellbore during the step of measuring the property of the formation or the borehole.

14. The method of claim 12, further comprising connecting the well logging tool to at least one of a logging-while-drilling system comprising a downhole motor and a coiled tubing drilling system.

15. The method of claim 12, wherein the property of the formation or the borehole is measured in at least four azimuthal directions simultaneously.

16. The method of claim 12, wherein the property of the formation is the neutron porosity, hydrogen index, bulk density, Sigma or slowing down time

17. The method of claim 12, wherein the property of the borehole comprises at least one of a tool stand off from the borehole wall at different azimuthal orientations and a borehole diameter.

18. A well logging instrument comprising: a collar; a pressure housing disposed within the collar; a neutron source disposed within the pressure housing; a mud channel; a chassis disposed within the collar; a first plurality of neutron detectors, the first plurality of neutron detectors being mounted on the chassis and azimuthally separated from each other; a second plurality of neutron detectors axially separated from the first plurality of neutron detectors, the second plurality of neutron detectors being mounted on the chassis and azimuthally separated from each other; an internal neutron shield comprising boron, the internal neutron shield being placed between a neutron detector and the chassis; and an external neutron shield placed on the collar, wherein the pressure housing is located in a first axial section of the well logging instrument and the chassis is located in a second axial section of the well logging instrument, wherein a first portion of the mud channel is disposed between the collar and the pressure housing in the first axial section of the well logging instrument, wherein a second portion of the mud channel is disposed within the chassis in the second axial section of the well logging instrument, wherein at least one of the first plurality of neutron detectors comprises at least one of a $^{10}$B based neutron detector, an Li-glass neutron detector, and a $^{10}$B-lined neutron detector, wherein the first plurality of neutron detectors comprises a first neutron detector and a second neutron detector, and wherein the first neutron detector is azimuthally separated from the second neutron detector by approximately 180 degrees.

* * * * *